(12) United States Patent
Shinke et al.

(10) Patent No.: US 10,059,856 B2
(45) Date of Patent: Aug. 28, 2018

(54) METALLIC COATING COMPOSITION

(71) Applicant: KANSAI PAINT CO., LTD., Hyogo (JP)

(72) Inventors: Ryusuke Shinke, Aichi (JP); Yoshinori Kato, Aichi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/292,480

(22) Filed: Oct. 13, 2016

(65) Prior Publication Data

US 2017/0107393 A1  Apr. 20, 2017

(30) Foreign Application Priority Data

Oct. 15, 2015 (JP) ................... 2015-203458

(51) Int. Cl.
| | | |
|---|---|---|
| *B05D 7/00* | (2006.01) | |
| *C09D 143/02* | (2006.01) | |
| *C09D 125/14* | (2006.01) | |
| *C08F 212/08* | (2006.01) | |
| *C09D 133/14* | (2006.01) | |
| *C09D 7/61* | (2018.01) | |
| *B05D 5/06* | (2006.01) | |

(52) U.S. Cl.
CPC .......... *C09D 125/14* (2013.01); *C08F 212/08* (2013.01); *C09D 7/61* (2018.01); *C09D 133/14* (2013.01); *C09D 143/02* (2013.01); *B05D 5/067* (2013.01); *B05D 7/57* (2013.01); *B05D 2202/25* (2013.01)

(58) Field of Classification Search
CPC .... C08F 212/08; C08F 220/20; C08F 220/34; C08F 2220/1825; C08F 2220/1883; C08F 230/02; C09D 125/14; C09D 143/02; C09D 7/1216; B05D 7/57; B05D 2202/25; B05D 5/067
USPC ....................................................... 427/419.1
See application file for complete search history.

(56) References Cited

U.S. PATENT DOCUMENTS

| | | | |
|---|---|---|---|
| 2003/0083402 A1* | 5/2003 | Okada ...................... | C09D 5/03 523/340 |
| 2006/0057363 A1* | 3/2006 | Takahashi .............. | B05D 5/068 428/323 |

FOREIGN PATENT DOCUMENTS

| | | |
|---|---|---|
| JP | 2000-178478 | 6/2000 |
| JP | 2004-339275 | 12/2004 |
| JP | 2005-120249 | 5/2005 |
| JP | 2006-169416 | 6/2006 |
| JP | 2012-77198 | 4/2012 |

\* cited by examiner

*Primary Examiner* — Alexander M Weddle
(74) *Attorney, Agent, or Firm* — Wenderoth, Lind & Ponack, L.L.P.

(57) ABSTRACT

The invention provides: a metallic coating composition and a method for forming the coating film. The metallic coating composition includes: a binder component containing a phosphate group-containing acrylic resin (A), a polyisocyanate compound (B), and a cellulose resin (C); and a vapor-deposition aluminum pigment (D), wherein the vapor-deposition aluminum pigment (D) is present in an amount of 10 to 95 parts by mass per 100 parts by mass of the total solids content of the binder component, and wherein the phosphate group-containing acrylic resin (A) is a copolymer resin of a monomer mixture consisting of 3 to 48 mass % of a phosphate group-containing polymerizable unsaturated monomer (a1), 6 to 45 mass % of a hydroxy-containing polymerizable unsaturated monomer (a2), and 10 to 91 mass % of other polymerizable unsaturated monomer (a3), based on the total amount of all of the monomers.

6 Claims, No Drawings

METALLIC COATING COMPOSITION

CROSS-REFERENCE TO RELATED PATENT APPLICATIONS

This application claims priority to Japanese Patent Application No. 2015-203458 filed on Oct. 15, 2015, which is incorporated by reference in its entirety.

TECHNICAL FIELD

The present invention relates to a metallic coating composition and a method for forming a coating film.

BACKGROUND ART

Aluminium substrates are widely used in automobile parts, such as aluminum wheels. A metallic aluminum wheel can be obtained by coating an optionally treated aluminum substrate with a base coating composition multiple times, and then further coating the substrate with a metallic coating composition containing a vapor-deposition aluminum pigment.

For example, Patent Literature 1 discloses a metallic coating composition comprising an effect pigment obtained by crushing a vapor-deposition metal film into metal pieces, and a phosphate group-containing compound. Patent Literature 1 also discloses a method for forming a metallic coating film comprising forming an undercoating layer on a substrate, applying the metallic coating composition to form a metallic coating film layer, and further forming a clear coating film on the metallic coating film layer. However, simply increasing the aluminum pigment content in view of the disclosure of Patent Literature 1 may impair the coating composition stability or adhesion.

Patent Literature 2 discloses a metallic coating composition comprising a binder resin and metal flakes, wherein the binder resin is present in an amount of 50 to 700 parts by mass per 100 parts by mass of the metal flakes. The metallic coating composition is capable of forming a smooth and flat metallic coating film with excellent appearance because of the well-arranged metal flakes providing excellent metallic appearance, and even forming the top coating layer on the metallic coating film does not disturb the arrangement of the metal flakes. However, the coating composition disclosed in Patent Literature 2 may be insufficient in adhesion, weatherability, and specular gloss.

Patent Literature 3 discloses a metallic coating composition with a solids content of 1 to 10% obtained by adjusting a coating composition containing an acrylic resin, a melamine resin, an effect material, and a cellulose acetate butyrate resin with an ester-based solvent and/or a ketone-based solvent. However, increasing the effect material content in the coating composition disclosed in Patent Literature 3 to achieve specular gloss may impair at least any of coating composition stability, finished appearance, and adhesion.

Patent Literature 4 discloses a metallic coating composition containing an acrylic resin (a), a curing agent (b), an effect pigment obtained by crushing a vapor-deposition metal film into metal flakes (c), and a solvent (d). However, increasing the effect material content in the coating composition disclosed in Patent Literature 4 to achieve specular gloss may impair any of coating composition stability and adhesion.

Patent Literature 5 discloses a coating composition containing a resin, a vapor-deposition metal foil, and a solvent wherein the vapor-deposition metal foil is present in an amount of 100 parts by weight or more to 900 parts by weight or less, per 100 parts by weight of the resin. However, the coating composition disclosed in Patent Literature 5 may be unsatisfactory in at least any of finished appearance, adhesion, and weatherability.

Against such a background, there has been a demand for a metallic coating composition excellent in coating composition stability and capable of forming a coating film excellent in finished appearance, adhesion, weatherability, and specular gloss.

CITATION LIST

Patent Literature

Patent Literature 1: JP2000-178478A
Patent Literature 2: JP2004-339275A
Patent Literature 3: JP2005-120249A
Patent Literature 4: JP2006-169416A
Patent Literature 5: JP2012-77198A

SUMMARY OF INVENTION

Technical Problem

An object of the present invention is to provide a metallic coating composition excellent in coating composition stability and capable of forming a coating film excellent in finished appearance, adhesion, weatherability, and specular gloss.

Solution to Problem

The inventors conducted extensive research, and found that the object can be achieved by a metallic coating composition comprising a phosphate group-containing acrylic resin (A), a polyisocyanate compound (B), a cellulose resin (C), and a vapor-deposition aluminum pigment (D). The inventors then completed the present invention.

Specifically, the present invention includes the following embodiments.
Item 1. A metallic coating composition comprising:
 a binder component comprising
  a phosphate group-containing acrylic resin (A),
  a polyisocyanate compound (B), and
  a cellulose resin (C); and
 a vapor-deposition aluminum pigment (D),
the vapor-deposition aluminum pigment (D) being present in an amount of 10 to 95 parts by mass per 100 parts by mass of the total solids content of the binder component, and
 the phosphate group-containing acrylic resin (A) being a copolymer resin of a monomer mixture consisting of 3 to 48 mass % of a phosphate group-containing polymerizable unsaturated monomer (a1), 6 to 45 mass % of a hydroxy-containing polymerizable unsaturated monomer (a2), and 10 to 91 mass % of other polymerizable unsaturated monomer (a3), based on the total amount of all of the monomers.
Item 2. The metallic coating composition according to item 1,
 wherein the phosphate group-containing acrylic resin (A) is present in an amount of 50 to 90 parts by mass,
 the polyisocyanate compound (B) is present in an amount of 5 to 40 parts by mass, and
 the cellulose resin (C) is present in an amount of 1 to 20 parts by mass, per 100 parts by mass of the total solids content of the binder component.

Item 3. The metallic coating composition according to item 1 or 2, comprising an ultraviolet absorber (E) in an amount of 0.1 to 10 parts by mass per 100 parts by mass of the total solids content of the binder component.

Item 4. The metallic coating composition according to any one of items 1 to 3, wherein the solids content of the metallic coating composition is 0.1 to 2 mass %.

Item 5. A method for forming a coating film comprising:
forming a base coating film on an aluminum substrate;
forming a metallic coating film of the metallic coating composition according to any one of items 1 to 4 on the base coating film; and
forming at least one layer of a clear coating film on the metallic coating film.

Item 6. An aluminum wheel obtained by the method for forming a coating film according to item 5.

Advantageous Effects of Invention

The metallic coating composition according to the present invention is excellent in coating composition stability and is capable of forming a coating film excellent in finished appearance, adhesion, weatherability, and specular gloss. The composition can also provide a metallic aluminum wheel with the specular gloss at 60° C. being 200 or more.

DESCRIPTION OF EMBODIMENTS

The present invention relates to a metallic coating composition comprising: a binder component comprising a phosphate group-containing acrylic resin (A), a polyisocyanate compound (B), and a cellulose resin (C); and a vapor-deposition aluminum pigment (D), the vapor-deposition aluminum pigment (D) being present in an amount of 10 to 95 parts by mass per 100 parts by mass of the total solids content of the binder component and the phosphate group-containing acrylic resin (A) being a copolymer resin of a monomer mixture consisting of 3 to 48 mass % of a phosphate group-containing polymerizable unsaturated monomer (a1), 6 to 45 mass % of a hydroxy-containing polymerizable unsaturated monomer (a2), and 10 to 91 mass % of other polymerizable unsaturated monomer (a3), based on the total amount of all of the monomers.

The invention also relates to a coated article comprising, on an aluminum wheel, a base coating film, a coating film formed of the metallic coating composition, and a clear coating film.

In this application, a metallic coating composition refers to a coating composition that can form a metallic coating film. A metallic coating film refers to a coating film whose appearance (for example, hue, chroma, brightness or the like) differs depending on the observation angle, whereas a solid coating film is a coating film whose appearance does not differ depending on the observation angle.

Metallic Coating Composition
Phosphate Group-Containing Acrylic Resin (A)

The phosphate group-containing acrylic resin (A) is a copolymer resin of a monomer mixture consisting of a phosphate group-containing polymerizable unsaturated monomer (a1), a hydroxy-containing polymerizable unsaturated monomer (a2), and other polymerizable unsaturated monomer (a3).

The "polymerizable unsaturated monomer" refers to a monomer compound containing at least one radically polymerizable unsaturated group (polymerizable unsaturated group). Examples of the polymerizable unsaturated group include acryloyl group, methacryloyl group, vinyl group, allyl group, propenyl group, isopropenyl group, maleimide group, and vinyl ether group.

Phosphate group-containing acrylic resins (A) can be used singly, or in a combination of two or more.

Phosphate Group-Containing Polymerizable Unsaturated Monomer (a1)

The phosphate group-containing polymerizable unsaturated monomer (a1) refers to a polymerizable unsaturated monomer containing at least one phosphate group (e.g., —PO$_4$H$_2$ or —HPO$_4$—) per molecule. The phosphate group-containing polymerizable unsaturated monomer (a1) may be simply referred to as "monomer (a1)" below.

Specific examples of the monomer (a1) include polymerizable unsaturated monomers, such as 2-acryloyloxyethyl acid phosphate, 2-methacryloyloxy ethyl acid phosphate, 2-acryloyloxypropyl acid phosphate, and 2-methacryloyl oxypropyl acid phosphate; polymerizable unsaturated monomers obtained by addition of glycidyl (meth)acrylate to a monoalkyl phosphate (e.g., butyl phosphate, decyl phosphate, lauryl phosphate, and stearyl phosphate); polymerizable unsaturated monomers obtained by addition of glycidyl (meth)acrylate to benzyl phosphate; and polymerizable unsaturated monomers obtained, for example, by performing ring-opening addition of a cyclic ester to the hydroxy group of a hydroxy-containing (meth)acrylate, and reacting the result with phosphorus pentoxide or phosphorus oxychloride (a11). These monomers (a1) can be used singly, or in a combination of two or more. It is preferable to contain the polymerizable unsaturated monomer (a11) as the polymerizable unsaturated monomer (a1), from the standpoint of improvement in adhesion or weatherability of the coating film.

Examples of the hydroxy-containing (meth)acrylate include hydroxyethyl (meth)acrylate, hydroxypropyl (meth)acrylate, and hydroxybutyl (meth)acrylate.

Examples of the cyclic ester include β-propiolactone, dimethyl propiolactone, γ-butyrolactone, β-valerolactone, δ-valerolactone, γ-caprolactone, δ-caprolactone, ε-caprolactone, δ-caprolactone, ε-caprolactone, γ-caprylolactone, and δ-laurolactone, with ε-caprolactone being preferable.

Examples of the polymerizable unsaturated monomer (a11) include the polymerizable unsaturated monomer represented by the following formula

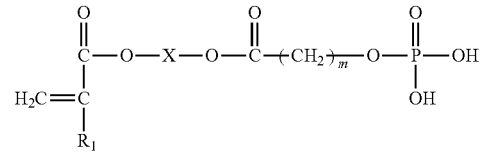

wherein R$^1$ represents hydrogen or methyl,
X represents alkylene having 1 to 12 carbon atoms, and
M represents an integer of 2 to 6.

X represents alkylene having 1 to 12 carbon atoms, and preferably about 1 to 4 carbon atoms.

Alkylene includes methylene, ethylene, propylene, and butylene.

Hydroxy-Containing Polymerizable Unsaturated Monomer (a2)

The hydroxy-containing polymerizable unsaturated monomer (a2) refers to a polymerizable unsaturated monomer containing at least one hydroxy group per molecule. The hydroxy-containing polymerizable unsaturated monomer (a2) may be simply referred to as "monomer (a2)" below.

Specific examples of the monomer (a2) include polymerizable unsaturated monomers, such as 2-hydroxyethyl (meth)acrylate, hydroxypropyl (meth)acrylate, 2,3-dihydroxybutyl (meth)acrylate, and 4-hydroxybutyl (meth)acrylate; monoester compounds of polyhydric alcohols with acrylic acid or methacrylic acid, such as polyethylene glycol mono(meth)acrylate; and compounds obtained by ring-opening addition of ε-caprolactone to monoesters of polyhydric alcohols with acrylic acid or methacrylic acid, such as ε-caprolactone modified vinyl monomer obtained by ring-opening addition of ε-caprolactone to 2-hydroxyethyl (meth)acrylate (e.g., Placcel FA-1, Placcel FA-2D, Placcel FA-3, Placcel FA-4, Placcel FA-5, Placcel FM-1, Placcel FM-2D, Placcel FM-3, Placcel FM-4, and Placcel FM-5; trade names, all produced by Daicel Corporation).

Of these, 4-hydroxybutyl (meth)acrylate, polyethylene glycol mono(meth)acrylate, and compounds obtained by ring-opening addition of ε-caprolactone to monoesters of polyhydric alcohols with acrylic acid or methacrylic acid are preferable from the standpoint of reactivity. These monomers (a2) can be used singly, or in a combination of two or more.

Other Polymerizable Unsaturated Monomer (a3)

The other polymerizable unsaturated monomer (a3) refers to monomers other than the phosphate group-containing polymerizable unsaturated monomer (a1) and the hydroxy-containing polymerizable unsaturated monomer (a2). The other polymerizable unsaturated monomer (a3) may be referred to as "monomer (a3)" below.

Examples of the other polymerizable unsaturated monomer (a3) include acrylic acid ester compounds and methacrylic acid ester compounds that both contain one or more hydrocarbon groups that may optionally contain one or more ring structure having 1 to 24 carbon atoms, such as methyl (meth)acrylate, ethyl (meth)acrylate, isopropyl (meth)acrylate, n-butyl (meth)acrylate, isobutyl (meth)acrylate, s-butyl (meth)acrylate, t-butyl (meth)acrylate, n-octyl (meth)acrylate, 2-ethylhexyl (meth)acrylate, decyl (meth)acrylate, undecyl (meth)acrylate, dodecyl (meth)acrylate, tridecyl (meth)acrylate, stearyl (meth)acrylate, isostearyl (meth) acrylate (Osaka Organic Chemical Industry Ltd.), cyclohexyl (meth)acrylate, isobornyl (meth)acrylate, dicyclopentanyl (meth)acrylate, dicyclopentenyl (meth)acrylate, and benzyl (meth)acrylate; aromatic ring-containing vinyl compounds, such as styrene, vinyltoluene, and α-methyl styrene; vinyl ester compounds, such as vinyl propionate and vinyl acetate; nitrile compounds, such as acrylonitrile and methacrylonitrile; epoxy group-containing vinyl compounds, such as glycidyl (meth) acrylate, 3,4-epoxycyclohexylmethyl (meth) acrylate, vinylcyclohexene monoepoxide, N-glycidyl acrylamide, and allyl glycidyl ether; carboxy-containing vinyl compounds, such as acrylic acid, methacrylic acid, maleic acid, fumaric acid, and itaconic acid; acid anhydride group-containing vinyl compounds, such as maleic anhydride, itaconic anhydride, and himic anhydride; amino group-containing aminoalkyl (meth)acrylate, such as N,N-dimethylaminoethyl (meth)acrylate, N,N-diethylaminoethyl (meth) acrylate, N,N-dimethylaminopropyl (meth) acrylate, N-t-butyl aminoethyl (meth)acrylate, and N,N-dimethylamino butyl (meth)acrylate; quaternary ammonium base-containing monomers, such as methacryloyloxy ethyl trimethylammonium chloride; and sulfonic group-containing polymerizable unsaturated monomers, such as 2-acrylamido-2-methylpropane sulfonic acid. These other polymerizable unsaturated monomers (a3) can be used singly, or in a combination of two or more.

The phosphate group-containing acrylic resin (A) can be obtained by polymerizing a monomer mixture consisting of the monomer (a1), the monomer (a2), and the monomer (a3), for example, by solution polymerization or mass-suspension-two-step polymerization in which after mass polymerization, suspension polymerization is performed.

In particular, solution polymerization is preferable to obtain the phosphate group-containing acrylic resin (A). Examples of solution polymerization include a method comprising dissolving or dispersing the monomer mixture in an organic solvent, and heating the solution or suspension in the presence of a radical polymerization initiator typically at a temperature of about 80° C. to 200° C. with stirring. A reaction time of typically about 1 to 10 hours is suitable.

Examples of the radical polymerization initiator include azo polymerization initiators, such as 2,2'-azobis isobutyronitrile, azobis-2-methylbutyronitrile, and azobis divaleronitrile; and organic peroxide polymerization initiators, such as t-butylperoxy isobutyrate, t-butylperoxy-2-ethylhexanoate, t-amylperoxy-3,5,5-trimethylhexanoate, t-butylperoxyisopropylcarbonate, 2,2-bis(4,4-di-t-butylperoxycyclohexyl)propane, di-t-butyl peroxide, and di-t-amyl peroxide.

Examples of organic solvents include hydrocarbon solvents, such as toluene, xylene, and mineral spirits; ester solvents, such as ethyl acetate, n-butyl acetate, isobutyl acetate, ethylene glycol monomethyl ether acetate, and butyl carbitol acetate; ketone solvents, such as methyl ethyl ketone, methyl isobutyl ketone, and diisobutyl ketone; alcohol solvents, such as methanol, ethanol, isopropanol, 1-butanol, 2-butanol, isobutanol, 1-hexanol, 1-octanol, 2-octanol, 2-ethylhexanol, 1-decanol, benzyl alcohol, diethylene glycol, ethylene glycol monomethyl ether, ethylene glycol monoethyl ether, ethylene glycol mono 2-ethylhexyl ether, propylene glycol mono n-butyl ether, dipropylene glycol mono n-butyl ether, tripropylene glycol mono n-butyl ether, propylene glycol mono 2-ethylhexyl ether, and propylene glycol monophenyl ether; ether solvents, such as ethylbutyl ether, dibutyl ether, diisobutyl ether, 1,4-dioxane, ethylene glycol dimethyl ether, diethylene glycol dimethyl ether, propylene glycol dimethyl ether, and dipropylene glycol dimethyl ether; amide solvents, such as N,N-dimethylacetamide, dimethylformamide, N-methyl-2-pyrrolidone, and N,N-dimethyl-β-methoxy propionamide; and aromatic petroleum solvents, such as Swasol 310, Swasol 1000, and Swasol 1500 (Cosmo Oil Co., Ltd.). These organic solvents can be used singly, or in a combination of two or more.

In the production of the phosphate group-containing acrylic resin (A), it is preferable from the standpoint of improvement in finished appearance, adhesion, and specular gloss that the proportion of the monomer (a1) is 3 to 48 mass %, and preferably 10 to 45 mass %, the proportion of the monomer (a2) is 6 to 45 mass %, and preferably 9 to 40 mass %, and the proportion of the monomer (a3) is 10 to 91 mass %, and preferably 15 to 81 mass %, all based on the total amount of all of the monomers.

It is preferred that the thus-obtained phosphate group-containing acrylic resin (A) has a weight average molecular weight within the range of 3,000 to 100,000, and preferably 7,000 to 30,000, a hydroxy value within the range of 10 to 100 mg KOH/g, and preferably 25 to 80 mg KOH/g, and an acid value within the range of 1 to 200 mg KOH/g, and preferably 3 to 150 mg KOH/g.

In this specification, the weight average molecular weight is the value calculated from a chromatogram measured by gel permeation chromatography based on the molecular weight of standard polystyrene in accordance with the procedure described in JIS K 0124-83. An HLC8120GPC apparatus (produced by Tosoh Corporation) was used for the gel permeation chromatography. The gel permeation chromatography was performed with four columns "TSKgel G-4000HXL," "TSKgel G-3000HXL," "TSKgel G-2500HXL," and "TSKgel G-2000HXL" (all produced by Tosoh Corporation) under the following conditions: mobile phase tetrahydrofuran; measurement temperature 40° C.; flow rate 1 ml/min; and detector RI.

In this specification, "(meth)acrylate" refers to "acrylate or methacrylate."

Polyisocyanate Compound (B)

The polyisocyanate compound (B) is a compound containing two or more isocyanate groups per molecule. Either blocked polyisocyanate whose isocyanate group is blocked with a blocking agent or polyisocyanate whose isocyanate group is not blocked with a blocking agent may be used.

Examples of compounds containing two or more isocyanate groups per molecule include aromatic diisocyanates, such as tolylene diisocyanate, diphenylmethane diisocyanate, xylylene diisocyanate, and naphthalene diisocyanate; aliphatic diisocyanates, such as tetramethylene diisocyanate, hexamethylene diisocyanate, dimer acid diisocyanate, and lysine diisocyanate; alicyclic diisocyanates, such as methylenebis (cyclohexylisocyanate), isophorone diisocyanate, methylcyclohexane diisocyanate, cyclohexane diisocyanate, and cyclopentane diisocyanate; biuret adducts of the polyisocyanates, and isocyanurate ring adducts; and free isocyanate group-containing prepolymers obtained by reacting these polyisocyanates with a low-molecular-weight or high-molecular-weight polyol compound (e.g., acrylic polyol, polyester polyol, and polyether polyol) in the presence of excess isocyanate groups.

Also usable are those obtained by blocking free isocyanate groups of these polyisocyanate compounds with a blocking agent, such as a phenol compound, an oxime compound, an active methylene compound, a lactam compound, an alcohol compound, a mercaptan compound, an acid amid compound, an imide compound, an amine compound, an imidazole compound, a urea compound, a carbamic acid compound, and an imine compound.

Polyisocyanate compounds (B) can be used singly, or in a combination of two or more.

Cellulose Resin (C)

Examples of the cellulose resin (C) include nitro cellulose, cellulose acetate butyrate, cellulose acetate, and cellulose acetate propionate. Of these, cellulose acetate butyrate is preferable.

Cellulose acetate butyrate can be obtained by further butyl-esterifying partially acetylated cellulose. Commercially available products include "CAB-381-0.5," "CAB-381-0.1," "CAB-381-2.0," "CAB-551-0.2," "CAB-551-0.01," "CAB-553-0.4," "CAB-531-1," "CAB-500-5," "CAB-321-0.1," "Solus2100," and "Solus2300" (trade names, all produced by Eastman Chemical Company, US). These can be used singly, or in a combination of two or more.

The cellulose resin (C) has a weight average molecular weight of 25,000 to 100,000, preferably 40,000 to 85,000, and more preferably 60,000 to 80,000.

Cellulose resins (C) can be used singly, or in a combination of two or more.

From the standpoint of improvement in coating composition stability as well as finished appearance, adhesion, and weatherability of the obtained coating film, it is preferred that in the coating composition of the present invention, the proportion of the phosphate group-containing acrylic resin (A) is 50 to 90 parts by mass, and preferably 55 to 75 parts by mass; the proportion of the polyisocyanate compound (B) is 5 to 40 parts by mass, and preferably 8 to 35 parts by mass; and the proportion of the cellulose resin (C) is 1 to 20 parts by mass, and preferably 5 to 17 parts by mass, all based on the total solids content by mass of the binder component containing the phosphate group-containing acrylic resin (A), the polyisocyanate compound (B), and the cellulose resin (C).

Vapor-Deposition Aluminum Pigment (D)

The vapor-deposition aluminum pigment (D) is a pigment obtained by shredding a vapor-deposited aluminum film into flakes. The method for producing the vapor-deposition aluminum pigment (D) is not limited. The pigment can be produced using, for example, a plastic film, such as oriented polypropylene, crystalline polypropylene, and polyethylene terephthalate, as a base film, by applying a remover on the film, and depositing aluminum on the applied remover; after the deposition of aluminum, for example, a top coating agent is applied to the surface of the deposited aluminum to prevent oxidation of the deposited aluminum. Then, the deposited aluminum film is removed from the base film, and shredded into flaky aluminum, which is then classified to obtain the pigment.

Vapor-deposition aluminum pigments (D) can be used singly, or in a combination of two or more.

It is preferred from the standpoint of coating composition stability and finished appearance that this vapor-deposition aluminum pigment (D) typically has a mean particle size of about 1 to 50 μm, preferably about 5 to 20 μm, and a thickness of 0.01 μm to 0.05 μm, particularly 0.02 μm to 0.04 μm. In this specification, the mean particle size is measured with UPA-EX250 (trade name, Nikkiso Co., Ltd., a particle size distribution analyzer using dynamic light scattering).

Examples of commercially available products of the vapor-deposition aluminum pigment (D) include Metasheen 71-0010 (BASF A.G., trade name), Metalure L55700 (Eckart, trade name), and Starbrite 2100-EAC (Silverline, trade name).

It is preferred from the standpoint of improvement in finished appearance, adhesion, and weatherability that the proportion of the vapor-deposition aluminum pigment (D) is 10 to 95 parts by mass, and preferably 65 to 92 parts by mass, per 100 parts by mass of the total solids content of the binder component containing the phosphate group-containing acrylic resin (A), the polyisocyanate compound (B), and the cellulose resin (C).

Ultraviolet Absorber (E)

The metallic coating composition according to the present invention may optionally comprise an ultraviolet absorber (E). A known ultraviolet absorber can be used as the ultraviolet absorber (E); for example, a benzotriazole absorber, a triazine absorber, a salicylic acid derivative absorber, and a benzophenone absorber can be used.

Specific examples of the benzotriazole absorber include 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amyl phenyl)benzotriazole, 2-(2'-hydroxy-4'-octoxy phenyl)benzotriazole, and 2-{2'-hydroxy-3'-(3",4",5",6"-tetrahydro phthalimidomethyl)-5'-methylphenyl}benzotriazole.

Specific examples of the triazine absorber include 2,4-bis (2,4-dimethylphenyl)-6-(2-hydroxy-4-isooctyloxyphenyl)-1,3,5-thoriazine, 2-[4((2-hydroxy-3-dodecyloxypropyl)- oxy)-2-hydroxyphenyl]-4,6-bis(2,4-dimethylphenyl)-1,3,5-thoriazine, 2-[4-((2-hydroxy-3-tridecyloxypropyl)-oxy)-2-hydroxyphenyl]-4,6-bis(2,4-dimethylphenyl)-1,3,5-thoriazine, and 2-(2,4-dihydroxyphenyl)-4,6-bis(2,4-dimethylphenyl)-1,3,5-triazine. Specific examples of the salicylic acid derivative absorber include phenyl salicylate, p-octylphenyl salicylate, and 4-tert-butyl phenyl salicylate.

Specific examples of the benzophenone absorber include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfo benzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, and hydroxydodecylbenzophenone. As an ultraviolet absorber, known polymer ultraviolet absorbers, such as 2-(2'-hydroxy-5'-methacryloyloxy-ethyl phenyl)-2H-benzotriazole and 2,2'-dihydroxy-4(3-metacryloxy-2-hydroxypropoxy)benzophenone, are also usable.

Examples of commercially available products of the ultraviolet absorber (E) include Tinuvin 900, Tinuvin 928, Tinuvin 348-2, Tinuvin 479, Tinuvin 405, Tinuvin 292 (BASF A.G., trade names, Tinuvin (Trademark)), Ruva-93 (Otsuka Chemical Co., Ltd., trade name), and Hostavin 3206HP LIQ (Du Pont, trade name).

Ultraviolet absorbers (E) can be used singly, or in a combination of two or more.

It is preferred that the amount of the optionally added ultraviolet absorber (E) is 0.1 to 10 parts by mass, preferably 0.3 to 5 parts by mass, per 100 parts by mass of the solids content of the binder component, if the ultraviolet absorber (E) is added.

Other Components

The metallic coating composition according to the present invention may optionally comprise other pigments, catalysts, other pigment dispersants, other resins (e.g., acrylic resin and polyester resin), dyes, plasticizers, reactive diluents, antisettling agents, light stabilizers, antioxidants, surface control agents, surfactants, NAD, rheology control agents, thickeners, antifoamers, lubricants, crosslinked polymer particles (microgel), and organic solvents singly, or in a combination of two or more.

Examples of other pigments include color pigments, such as titanium white and carbon black; extender pigments, such as clay, talc, baryta, and kaolin; anticorrosive pigments, such as aluminum dihydrogen tripolyphosphate and aluminum phosphomolybdate; and bismuth compounds, such as bismuth oxide, bismuth hydroxide, and bismuth lactate.

Examples of catalysts include organic tin compounds, such as dibutyl tin oxide and dioctyl tin oxide; and tin compounds, such as aliphatic or aromatic carboxylic acid salts including dibutyltin dilaurate, dioctyltin dilaurate, dibutyltin diacetate, dioctyltin dibenzoate, and dibutyltin dibenzoate.

Examples of commercially available products of rheology control agents include amide waxes, such as Disparlon 6900 (Kusumoto Chemicals, Ltd.) and Thixol W-300 (Kyoeisha Chemical Co., Ltd.); waxes such as polyethylene waxes including Disparlon 4200 (Kusumoto Chemicals, Ltd.); cellulose-based rheology control agents, such as CAB (cellulose acetate butyrate, Eastman Chemical Products, Inc.), HEC (hydroxyethyl cellulose), hydrophobized HEC, and CMC (carboxy methylcellulose); urethane urea-based rheology control agents, such as BYK-410, BYK-411, BYK-420, and BYK-425 (all produced by BYK-Chemie); anionic rheology control agents, such as Flownon SDR-80 (Kyoeisha Chemical Co., Ltd.); polyolefin-based rheology control agents, such as Flownon SA-345HF (Kyoeisha Chemical Co., Ltd.); and higher fatty acid amide rheology control agents, such as Flownon HR-4AF (Kyoeisha Chemical Co., Ltd.). Commercially available products of reactive diluents include Placcel 205, Placcel 303, and Placcel 305 (all produced by Daicel Corporation, trade names).

In a preferable embodiment of the present invention, the metallic coating composition is an organic solvent based coating composition.

The metallic coating composition according to the present invention can be obtained by mixing the phosphate group-containing acrylic resin (A), the polyisocyanate compound (B), the cellulose resin (C), and the vapor-deposition aluminum pigment (D), optionally with the ultraviolet absorber (E) and other components, and diluting the mixture with an organic solvent.

In particular, to obtain a coating film excellent in finished appearance and specular gloss, particularly to obtain a metallic coating film with the specular gloss at 60° C. being 200 or more, it is preferred that at the time point at which the metallic coating composition according to the present invention is used for coating, the composition has a solids content of 0.1 to 2 mass %, preferably 0.2 to 1.8 mass %, and more preferably 0.3 to 1.6 mass %.

The metallic coating composition according to the present invention is suitably applied to metal substrates, specifically aluminum substrates of automobile parts, building materials, etc., and particularly to aluminum wheels. From the standpoint of finished appearance and adhesion, the aluminum wheels are preferably those that are formed from an alloy containing aluminum as the major component, and magnesium, silicon, and other components; and that are surface-treated, for example, by chromate treatment (e.g., chromic chromate and chromic phosphate) or chromium-free treatment (e.g., zirconium phosphate and zirconium oxide).

Method for Forming a Coating Film

The method for forming a coating film according to the present invention includes:

Step (1) of forming a base coating film on an aluminum substrate;

Step (2) of applying the metallic coating composition of the present invention to form an uncured coating film; and Step (3) of forming at least one layer of a clear coating film on the uncured coating film of the metallic coating composition. The following describes the method in detail.

Step (1): In this step, a base coating composition, such as an acrylic resin coating composition, is applied to an aluminum substrate, and baked dry at a temperature of 70 to 180° C., preferably 110 to 150° C., for about 1 to 60 minutes, preferably about 3 to 30 minutes, to form a base coating film. The base coating composition can be of any color; black-based base coating compositions are particularly preferable from the standpoint of improvement in finished appearance. The base film has a thickness of 5 to 50 μm, and preferably 10 to 40 μm, on a dry film basis.

Step (2): In this step, the metallic coating composition of the present invention is applied. The coating film has a thickness of 0.1 to 1.0 μm, and preferably 0.1 to 0.5 μm, on a dry film basis. It is preferred that after the application of the metallic coating composition, the coating film is typically allowed to stand at room temperature for about 10 seconds to 10 minutes, and then a clear coating composition is applied thereon.

Step (3): In this step, a clear coating composition is applied onto the coating film of the metallic coating composition to form at least one layer of the clear coating film. Acrylic resin coating compositions are suitable for use as the clear coating composition. A specific example is a thermosetting coating composition obtained by dissolving or dispersing an acrylic resin, a crosslinking agent, and other components in an organic solvent.

The clear coating film is dried at a temperature of 100 to 180° C., preferably 110 to 150° C., for about 5 to 60 minutes, preferably about 10 to 40 minutes. It is preferred that the clear coating film has a thickness of 5 to 50 µm, and preferably 15 to 40 µm for each layer, on a cured film basis. Then, coated aluminum products are obtained.

The present invention encompasses aluminum substrates, such as aluminum wheels, obtained by this method for forming a coating film. Specific examples include aluminum products, such as coated aluminum wheels that have a base coating film on an aluminum substrate (aluminum wheel), a metallic coating film of the metallic coating composition on the base coating film, and at least one layer of a clear coating film on the metallic coating film.

EXAMPLES

The following describes the present invention in more detail with reference to Production Examples, Examples, and Comparative Examples. However, the present invention is not limited to these Examples. In the following, "parts" and "%" respectively indicate "parts by mass" and "mass %"

Production Example 1: Production of Phosphate Group-Containing Monomer A (Material in Process)

358 parts of Placcel FM-2D (*1) was added to a reactor equipped with a stirrer, a thermometer, a reflux condenser, etc. With dry air bubbling in the reaction mixture, 63.9 parts of phosphorus pentoxide was added thereto bit by bit at 50 to 60° C. After the total amount of the phosphorus pentoxide was added, the mixture was aged at 60° C. for 5 hours, and 9.0 parts of deionized water was added thereto, followed by further aging at 80° C. for 5 hours, thereby obtaining phosphate group-containing monomer A.

(*1) Placcel FM-2D: Daicel Corporation, trade name, a monomer obtained by addition of 2 moles of ε-caprolactone to 1 mole of 2-hydroxy ethyl methacrylate Production of Phosphate Group-Containing Acrylic Resin (A)

Production Example 2: Production of Copolymer Resin No. 1 Solution 120 parts of dipropylene glycol dimethyl ether was added to a reactor equipped with a thermometer, a thermostat, a stirrer, a reflux condenser, a nitrogen inlet tube, and a dropping funnel, and heated to 110° C. With the same temperature being maintained, the following monomer mixture was added dropwise over 4 hours. After completion of the dropwise addition, the mixture was aged with stirring for 1 hour.

Subsequently, a polymerization initiator solution consisting of 1 part of t-butylperoxy-2-ethylhexanoate and 30 parts of dipropylene glycol dimethyl ether was added dropwise over 1 hour. After completion of the dropwise addition, the mixture was aged with stirring for 1 hour, thereby obtaining copolymer resin No. 1 solution with a solids content of 45 mass %. The obtained copolymer resin No. 1 had a weight average molecular weight of 15,000, a hydroxy value of 30 mg KOH/g, and an acid value of 16 mg KOH/g.

| Monomer Mixture | |
| --- | --- |
| Light Ester P-1M (*2) | 3 parts |
| 2-Hydroxy ethyl methacrylate | 10 parts |
| Placcel FM-3X (*3) | 25 parts |
| n-Butyl acrylate | 10 parts |
| Lauryl methacrylate | 10 parts |
| Dimethylamino ethyl methacrylate | 1 part |
| Styrene | 41 parts |
| 2,2'-Azobisisobutyronitrile | 5 parts. |

Production Examples 3 to 11: Production Examples of Copolymer Resin Nos. 2 to 10 Solutions The procedure of Production Example 2 was repeated except that the monomer mixture was replaced with those shown in Table 1 below, thereby obtaining copolymer resin Nos. 2 to 10 solutions. The numerical values of the formulations shown in Table 1 indicate parts by mass on a solids content basis.

TABLE 1

| | | | Production Examples | | | | | | | | |
| --- | --- | --- | --- | --- | --- | --- | --- | --- | --- | --- | --- |
| | | | 2 | 3 | 4 | 5 | 6 | 7 | 8 | 9 | 10 | 11 |
| | | | Copolymer Resin Solution No. | | | | | | | | |
| | | | 1 | 2 | 3 | 4 | 5 | 6 | 7 | 8 | 9 | 10 |
| Formu-lation | Phosphate Group-Containing Polymerizable Unsaturated Monomer (a1) | Light Ester P-1M (*2) | 3 | 5 | 12 | 30 | | | 0.5 | 1 | 50 | |
| | | Phosphate Group-ContainingMonomer A Obtained in Production Example 1 | | | | | 40 | 40 | | | | |
| | Hydroxy-Containing Polymerizable Unsaturated Monomer (a2) | 2-Hydroxyethyl Acrylate | | 20 | | 10 | 15 | 10 | | | 10 | |
| | | 2-Hydroxyethyl Methacrylate | 10 | | | | | | | | | 17 |
| | | Placcel FM-2D (*1) | | | | | | 10 | | | | |
| | | Placel FM-3 (*3) | 25 | | 10 | | | | | | 10 | 15 |
| | | 4-Hydroxybutyl Acrylate | | | 20 | | | | 20 | 20 | | |

TABLE 1-continued

| | | Production Examples | | | | | | | | | |
|---|---|---|---|---|---|---|---|---|---|---|---|
| | | 2 | 3 | 4 | 5 | 6 | 7 | 8 | 9 | 10 | 11 |
| | | Copolymer Resin Solution No. | | | | | | | | | |
| | | 1 | 2 | 3 | 4 | 5 | 6 | 7 | 8 | 9 | 10 |
| Other Polymerizable Unsaturated Monomer (a3) | Acrylic Acid | | | | | | | | | | 0.5 |
| | Styrene | 41 | 35.5 | 30 | 20 | 35 | 30 | | | 30 | 41.6 |
| | Methyl Methacrylate | | | 20 | | | | 43.5 | 42 | | |
| | n-Butyl Acrylate | 10 | 9 | 15 | 10 | | | | 5 | | 6.9 |
| | n-Butyl Methacrylate | | | | | | | 15 | 10 | | 19 |
| | Lauryl Methacrylate | 10 | 20 | | 20 | | | | | | |
| | Isostearyl Acrylate (*4) | | 10 | | | | | 18 | 20 | | |
| | Cyclohexyl Methacrylate | | | | | 10 | 10 | | | | |
| | Dimethylaminoethyl Methacrylate | 1 | 0.5 | 3 | | | | 3 | | | |
| | Methacryloyloxy Ethyl Ammonium Chloride | | | | | | | | | 2 | |
| Polymerization Initiator | t-Butylperoxy-2-ethylhexanoate | 5 | 5 | 5 | 5 | 5 | 5 | 5 | 5 | 5 | 5 |
| Resin Characteristic Values | Weight Average Molecular | 15,000 | 20,000 | 18,000 | 15,000 | 15,000 | 18,000 | 13,000 | 14,000 | 15,000 | 16,000 |
| | Hydroxy Value | 30 | 96 | 77 | 60 | 98 | 61 | 77 | 77 | 60 | 95 |
| | Acid Value | 16 | 26 | 62 | 140 | 69 | 98 | 3 | 5 | 122 | 4 |

The values in the formulations are indicated on a solids content basis.

(*2) Light Ester P-1M: Kyoeisha Chemical Co., Ltd., trade name, phosphate group-containing polymerizable unsaturated monomer, which is 2-methacryloyloxy ethyl acid phosphate.
(*3) Placcel FM-3: Daicel Corporation, trade name, a monomer obtained by addition of 3 moles of ε-caprolactone to 1 mole of 2-hydroxy ethyl methacrylate.
(*4) Isostearyl acrylate: Osaka Organic Chemical Industry Ltd., trade name, long-chain branched alkyl acrylate Production of Metallic Coating Composition Example 1: Production of Metallic Coating Composition No. 1

In accordance with steps 1 and 2 described below, metallic coating composition No. 1 was obtained.
Step 1: 5 parts of copolymer resin No. 4 solution (solids content) obtained in Production Example 5, 90 parts of Metasheen 71-0010 (*16) (solids content), and 95 parts of Swasol 1000 were mixed, and dispersed for 30 minutes using a paint shaker, thereby obtaining pigment dispersion paste No. 1 with a solids content of 50%.
Step 2: 95 parts of pigment dispersion paste No. 1 obtained in Step 1 (solids content), 60 parts of copolymer resin No. 1 solution obtained in Production Example 2 (solids content), 25 parts of Duranate MF-K60X (*6) (solids content), and 10 parts of CAB-381-20 (*9) (solids content) were homogeneously mixed, and Swasol 1000 was added thereto to adjust the solids content, thereby obtaining metallic coating composition No. 1 with a coating composition solids content of 0.8 mass %.

Examples 2 to 15: Production of Metallic Coating Compositions Nos. 2 to 15

The procedure of Example 1 was repeated except that the formulations shown in Table 2 below were applied, thereby obtaining metallic coating compositions Nos. 2 to 30.

TABLE 2

| | | | Examples | | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| | | | Metallic Coating Composition No. | | | | | | | | | | | | | | |
| | | | 1 | 2 | 3 | 4 | 5 | 6 | 7 | 8 | 9 | 10 | 11 | 12 | 13 | 14 | 15 |
| Resin Formulation | Phosphate Group-Containing Acrylic Resin (A) | Copolymer Resin No. 1 | 60 | | | | | | | | | | | | | | |
| | | Copolymer Resin No. 2 | | 60 | | | | | | | | | | | | | |
| | | Copolymer Resin No. 3 | | | 60 | | | | | | | | | | | | |
| | | Copolymer Resin No. 4 | | | | 60 | | | | | | | | | | | |
| | | Copolymer Resin No. 5 | | | | | 60 | | 60 | 60 | 60 | 60 | 60 | 60 | 60 | 60 | 60 |
| | | Copolymer Resin No. 6 | | | | | | 60 | | | | | | | | | |

TABLE 2-continued

| | | Examples | | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | Metallic Coating Composition No. | | | | | | | | | | | | | | |
| | | 1 | 2 | 3 | 4 | 5 | 6 | 7 | 8 | 9 | 10 | 11 | 12 | 13 | 14 | 15 |
| Polyisocyanate Compound (B) | Duranate MF-K60X (*6) | 25 | 25 | 25 | 25 | 25 | 25 | 25 | 25 | 25 | 25 | 25 | 25 | 25 | 25 | |
| | Desmodur BL-3175 (*7) | | | | | | | | | | | | | | | 25 |
| Melamine Resin | Cymel 303 (*8) | | | | | | | | | | | | | | | |
| Cellulose Resin (C) | CAB-381-20 (*9) | 10 | 10 | 10 | 10 | 10 | 10 | | | | 10 | 10 | 10 | 10 | 10 | 10 |
| | CAP-482-20 (*10) | | | | | | | 10 | | | | | | | | |
| | CAB-551-0.2 (*11) | | | | | | | | 10 | | | | | | | |
| | Nitro Cellulose DHX30-50 (*12) | | | | | | | | | 10 | | | | | | |
| Ultraviolet Absorber (E) | Hostavin 3206HP LIQ (*13) | | | | | | | | | | | | | | | |
| | Tinuvin 292 (*14) | | | | | | | | | | | | | | | |
| Light Stabilizer | Tinuvin 123 (*15) | | | | | | | | | | | | | | | |
| Pigment Paste Formulation — Phosphate Group-Containing Acrylic Resin (A) | Copolymer Resin No. 4 | 5 | 5 | 5 | 5 | 5 | 5 | 5 | 5 | 5 | 5 | 5 | 5 | 5 | 5 | 5 |
| | Copolymer Resin No. 5 | | | | | | | | | | | | | | | |
| | Copolymer Resin No. 6 | | | | | | | | | | | | | | | |
| Vapor-Deposition Aluminum Pigment (D) | Metasheen 71-0010 (*16) | 90 | 90 | 90 | 90 | 90 | 90 | 90 | 90 | 90 | | | 15 | 40 | 70 | 90 |
| | Metalure L55700 (*17) | | | | | | | | | | 90 | | | | | |
| | Starbrite 2100-EAC (*18) | | | | | | | | | | | 90 | | | | |
| Aluminum Pigment | 6360NS (*19) | | | | | | | | | | | | | | | |
| | MS650 Moonlight-Silver (*20) | | | | | | | | | | | | | | | |
| | Swasol 1000 | 95 | 95 | 95 | 95 | 95 | 95 | 95 | 95 | 95 | 95 | 95 | 95 | 95 | 95 | 95 |
| Solids Content of Metallic Coating Composition (%) | | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Performance | Coating Composition Stability (*21) | S | S | S | S | S | S | S | S | S | S | S | S | S | S | S |
| | Finished Appearance (*22) | S | S | S | S | S | S | S | S | S | S | S | A | A | S | S |
| | Adhesion (After immersion in water) (*23) | A | A | A | A | S | S | A | S | A | S | S | S | S | S | S |
| | Weatherability (*24) | A | A | A | A | A | A | A | A | A | A | A | A | A | A | A |
| | Specular Gloss at 60° C. (*25) | S | S | S | S | S | S | S | S | S | S | S | A | A | A | S |

The values in the formulations are indicated on a solids content basis.

Example 16: Production of Metallic Coating Composition No. 16

In accordance with steps 1 and 2 described below, metallic coating composition No. 16 was obtained.

Step 1: 5 parts of copolymer resin No. 4 solution obtained in Production Example 5 (solids content), 90 parts of Metasheen 71-0010 (*16) (solids content), and 95 parts of Swasol 1000 were mixed, and dispersed for 30 minutes using a paint shaker, thereby obtaining pigment dispersion paste No. 16 with a solids content of 50%.

Step 2: 95 parts of pigment dispersion paste No. 16 obtained in step 1 (solids content), 10 parts of copolymer resin No. 3 solution obtained in Production Example 4 (solids content), 50 parts of copolymer resin No. 4 solution obtained in Production Example 5 (solids content), 25 parts of Duranate MF-K60X (*6) (solids content), and 10 parts of CAB-381-20 (*9) (solids content) were homogeneously mixed, and Swasol 1000 was added thereto to adjust the solids content, thereby obtaining metallic coating composition No. 16 with a coating composition solids content of 0.8 mass %.

Examples 17 to 30: Production of Metallic Coating Compositions Nos. 17 to 30

The procedure of Example 1 was repeated except that the formulations shown in Table 3 below were applied, thereby obtaining metallic coating compositions Nos. 17 to 30.

TABLE 3

Table 3 (continued from Table 2)

| | | | Examples |||||||||||||||
|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 | 30 |
| | | | Metallic Coating Composition No. |||||||||||||||
| | | | 16 | 17 | 18 | 19 | 20 | 21 | 22 | 23 | 24 | 25 | 26 | 27 | 28 | 29 | 30 |
| Resin Formulation | Phosphate Group-Containing Acrylic Resin (A) | Copolymer Resin No. 1 | | | | | | | | | | | | | | | |
| | | Copolymer Resin No. 2 | | | | | | | | | | | | | | | |
| | | Copolymer Resin No. 3 | 10 | 10 | 10 | 10 | 10 | 10 | 10 | 10 | 10 | | | | | | |
| | | Copolymer Resin No. 4 | 50 | | | 50 | | | 50 | | | | | | | | |
| | | Copolymer Resin No. 5 | | 50 | | | 50 | | | 50 | | 60 | 60 | 60 | 60 | 75 | 75 |
| | | Copolymer Resin No. 6 | | | 50 | | | 50 | | | 50 | | | | | | |
| | Polyisocyanate Compound (B) | Duranate MF-K60X (*6) | 25 | 25 | 25 | 25 | 25 | 25 | 25 | 25 | 25 | 25 | 25 | 25 | 25 | 5 | 15 |
| | | Desmodur BL-3175 (*7) | | | | | | | | | | | | | | | |
| | Melamine Resin | Cymel 303 (*8) | | | | | | | | | | | | | | | |
| | Cellulose Resin (C) | CAB-381-20 (*9) | 10 | 10 | 10 | 10 | 10 | 10 | 10 | 10 | 10 | 10 | | 10 | 10 | 15 | 5 |
| | | CAP-482-20 (*10) | | | | | | | | | | | 10 | | | | |
| | | CAB-551-0.2 (*11) | | | | | | | | | | | | | | | |
| | | Nitro Cellulose DHX30-50 (*12) | | | | | | | | | | | | | | | |
| | Ultraviolet Absorber (E) | Hostavin 3206HP LIQ (*13) | | | | | | | | | | 1 | 1 | | 1 | | |
| | | Tinuvin 292 (*14) | | | | | | | | | | | | 1 | | | |
| | Light Stabilizer | Tinuvin 123 (*15) | | | | | | | | | | | | | 1 | | |
| Pigment Paste Formulation | Phosphate Group-Containing Acrylic Resin (A) | Copolymer Resin No. 4 | 5 | | | 5 | | | 5 | | | | | | | | |
| | | Copolymer Resin No. 5 | | 5 | | | 5 | | | 5 | | 5 | 5 | 5 | 5 | 5 | 5 |
| | | Copolymer Resin No. 6 | | | 5 | | | 5 | | | 5 | | | | | | |
| | Vapor-Deposition Aluminum Pigment (D) | Metasheen 71-0010 (*16) | 90 | 90 | 90 | | | | | | | 90 | 90 | 90 | 90 | 90 | 90 |
| | | Metalure L55700 (*17) | | | | 60 | 60 | 60 | | | | | | | | | |
| | | Starbrite 2100-EAC (*18) | | | | | | | 40 | 40 | 40 | | | | | | |
| | Aluminum Pigment | 6360NS (*19) | | | | | | | | | | | | | | | |
| | | MS650 Moonlight-Silver (*20) | | | | | | | | | | | | | | | |
| | Swasol 1000 | | 95 | 95 | 95 | 95 | 95 | 95 | 95 | 95 | 95 | 95 | 95 | 95 | 95 | 95 | 95 |
| Solids Content of Metallic Coating Composition (%) | | | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Performance | Coating Composition Stability (*21) | | S | S | S | S | S | S | S | S | S | S | S | S | S | S | S |
| | Finished Appearance (*22) | | S | S | S | A | A | A | A | A | A | S | S | S | S | A | A |
| | Adhesion (After immersion in water) (*23) | | A | S | S | S | S | S | S | S | S | S | A | S | S | A | A |
| | Weatherability (*24) | | A | A | A | A | A | A | A | A | A | S | S | S | S | A | A |
| | Specular Gloss at 60° C. (*25) | | S | S | S | A | A | A | A | A | A | S | S | S | S | A | A |

The values in the formulations are indicated on a solids content basis.

Comparative Example 1: Production of Metallic Coating Composition No. 31

In accordance with steps 1 and 2 described below, metallic coating composition No. 31 was obtained.
Step 1: 5 parts of copolymer resin No. 10 solution obtained in Production Example 11 (solids content), 90 parts of Metasheen 71-0010 (*16) (solids content), and 95 parts of Swasol 1000 were mixed and dispersed for 30 minutes using a paint shaker, thereby obtaining pigment dispersion paste No. 31 with a solids content of 50%.
Step 2: 95 parts of pigment dispersion paste No. 31 obtained in step 1 (solids content), 60 parts of copolymer resin No. 7 solution obtained in Production Example 8 (solids content), 25 parts of Duranate MF-K60X (*6) (solids content), and 10 parts of CAB-381-20 (*9) (solids content) were homogeneously mixed, and Swasol 1000 was added thereto to adjust the solids content, thereby obtaining metallic coating composition No. 31 with a coating composition solids content of 0.8 mass %.

Comparative Examples 2 to 17: Production of Metallic Coating Compositions Nos. 32 to 47

The procedure of Comparative Example 1 was repeated except that the formulations shown in Table 4 were applied, thereby obtaining metallic coating compositions Nos. 32 to 47.

TABLE 4

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| | | | Metallic Coating Composition No. | | | | | | | | | |
| | | | 31 | 32 | 33 | 34 | 35 | 36 | 37 | 38 | 39 | 40 |
| Pigment Paste Formulation | Phosphate Group-Containing Acrylic Resin (A) | Copolymer Resin No. 4 | | | | | | | | | | |
| | | Copolymer Resin No. 5 | | | | 70 | 70 | | | | 60 | 60 |
| | | Copolymer Resin No. 6 | | | | | | | | | | |
| | | Copolymer Resin No. 7 | 60 | | | | | | | | | |
| | | Copolymer Resin No. 8 | | 60 | | | | | | | | |
| | | Copolymer Resin No. 9 | | | 60 | | | | | | | |
| | Hydroxy-Containing Resin (E) | Copolymer Resin No. 10 | | | | | | 60 | 60 | 60 | | |
| | Polyisocyanate Compound (B) | Duranate MF-K60X (*6) | 25 | 25 | 25 | 25 | | 25 | 25 | 25 | 25 | 25 |
| | | Desmodur BL-3175 (*7) | | | | | 25 | | | | | |
| | Melamine Resin | Cymel 303 (*8) | | | | | | | | | | |
| | Cellulose Resin (C) | CAB-381-20 (*9) | 10 | 10 | 10 | | | 10 | | | 10 | 10 |
| | | CAP-482-20 (*10) | | | | | | | 10 | | | |
| | | CAB-551-0.2 (*11) | | | | | | | | 10 | | |
| | | Nitro Cellulose DHX30-50 (*12) | | | | | | | | | | |
| | Phosphate Group-Containing Acrylic Resin (A) | Copolymer Resin No. 4 | | | | | | | | | 5 | 5 |
| | | Copolymer Resin No. 5 | | | | 5 | 5 | | | | | |
| | | Copolymer Resin No. 6 | | | | | | | | | | |
| | | Copolymer Resin No. 10 | 5 | 5 | 5 | | | 5 | 5 | 5 | | |
| | Vapor-Deposition Aluminum Pigment (D) | Metasheen 71-0010 (*16) | 90 | 90 | 90 | 90 | 90 | 90 | 90 | 90 | 8 | 100 |
| | | Metalure L55700 (*17) | | | | | | | | | | |
| | | Starbrite 2100-EAC (*18) | | | | | | | | | | |
| | Aluminum Pigment | 6360NS (*19) | | | | | | | | | | |
| | | MS650 Moonlight-Silver (*20) | | | | | | | | | | |
| | | Swasol 1000 | 95 | 95 | 95 | 95 | 95 | 95 | 95 | 95 | 95 | 95 |
| Solids Content of Metallic Coating Composition (%) | | | 0.8 | 0.8 | 0.8 | 0.8 | 0.8 | 0.8 | 0.8 | 0.8 | 0.8 | 0.8 |
| Performance | Coating Composition Stability (*21) | | S | S | S | S | S | S | S | S | S | B |
| | Finished Appearance (*22) | | S | S | B | B | B | B | B | B | B | B |

TABLE 4-continued

|  |  |  |  |  |  |  |  |  |  |  |
|---|---|---|---|---|---|---|---|---|---|---|
| Adhesion (After immersion in water) (*23) | B | B | B | A | A | C | C | C | A | B |
| Weatherability (*24) | A | A | B | A | A | A | A | A | A | A |
| Specular Gloss at 60° C. (*25) | B | B | B | B | B | B | B | B | C | S |

|  |  |  | Comparative Examples |  |  |  |  |  |  |
|---|---|---|---|---|---|---|---|---|---|
|  |  |  | 11 | 12 | 13 | 14 | 15 | 16 | 17 |
|  |  |  | Metallic Coating Composition No. | | | | | | |
|  |  |  | 41 | 42 | 43 | 44 | 45 | 46 | 47 |
|  | Phosphate Group-Containing Acrylic Resin (A) | Copolymer Resin No. 4 |  |  |  |  | 60 |  |  |
|  |  | Copolymer Resin No. 5 | 60 | 60 | 60 | 60 |  | 60 |  |
|  |  | Copolymer Resin No. 6 |  |  |  |  |  |  | 60 |
|  |  | Copolymer Resin No. 7 |  |  |  |  |  |  |  |
|  |  | Copolymer Resin No. 8 |  |  |  |  |  |  |  |
|  |  | Copolymer Resin No. 9 |  |  |  |  |  |  |  |
|  | Hydroxy-Containing Resin (E) | Copolymer Resin No. 10 |  |  |  |  |  |  |  |
|  | Polyisocyanate Compound (B) | Duranate MF-K60X (*6) | 25 | 25 | 25 | 25 |  |  |  |
|  |  | Desmodur BL-3175 (*7) |  |  |  |  |  |  |  |
|  | Melamine Resin | Cymel 303 (*8) |  |  |  |  | 25 | 25 | 25 |
|  | Cellulose Resin (C) | CAB-381-20 (*9) | 10 | 10 | 10 | 10 | 10 | 10 | 10 |
|  |  | CAP-482-20 (*10) |  |  |  |  |  |  |  |
|  |  | CAB-551-0.2 (*11) |  |  |  |  |  |  |  |
|  |  | Nitro Cellulose DHX30-50 (*12) |  |  |  |  |  |  |  |
| Pigment Paste Formulation | Phosphate Group-Containing Acrylic Resin (A) | Copolymer Resin No. 4 | 5 | 5 | 5 | 5 | 5 |  |  |
|  |  | Copolymer Resin No. 5 |  |  |  |  |  | 5 |  |
|  |  | Copolymer Resin No. 6 |  |  |  |  |  |  | 5 |
|  |  | Copolymer Resin No. 10 |  |  |  |  |  |  |  |
|  | Vapor-Deposition Aluminum Pigment (D) | Metasheen 71-0010 (*16) |  |  |  |  | 90 | 90 | 90 |
|  |  | Metalure L55700 (*17) | 8 | 100 |  |  |  |  |  |
|  |  | Starbrite 2100-EAC (*18) |  |  |  |  |  |  |  |
|  | Aluminum Pigment | 6360NS MS650 (*19) |  |  |  | 90 |  |  |  |
|  |  | Moonlight-Silver (*20) |  |  | 90 |  |  |  |  |
|  |  | Swasol 1000 | 95 | 95 | 95 | 95 | 95 | 95 | 95 |
| Solids Content of Metallic Coating Composition (%) |  |  | 0.8 | 0.8 | 0.8 | 0.8 | 0.8 | 0.8 | 0.8 |
| Performance | Coating Composition Stability (*21) |  | S | B | A | A | S | S | S |
|  | Finished Appearance (*22) |  | B | B | C | C | A | A | A |
|  | Adhesion (After immersion in water) (*23) |  | A | B | A | A | B | B | B |
|  | Weatherability (*24) |  | A | A | A | A | A | A | A |
|  | Specular Gloss at 60° C. (*25) |  | C | S | C | C | B | B | B |

The values in the formulations are indicated on a solids content basis.

(*6) Duranate MF-K60X: Asahi Kasei Chemicals Corporation, a resin solution of hexamethylene diisocyanate blocked with active methylene, solids content of 60%
(*7) Desmodur BL-3175: Sumika Bayer Urethane Co., Ltd., an isocyanurate polyisocyanate compound solution based on hexamethylene diisocyanate, blocked with methyl ethyl ketoxime, solids content of about 75%
(*8) Cymel 303: Daicel-Allnex Ltd., trade name, a methyl-etherified melamine resin
(*9) CAB-381-20: Cellulose acetate butyrate, Eastman Chemical Products, Inc., trade name, acetyl group content=13.5%, butyryl group content=37%, number average molecular weight 70,000
(*10) CAP-482-20: Cellulose acetate propionate, Eastman Chemical Products, Inc., trade name, acetyl group content=2.5%, propionyl group content=46%, number average molecular weight 75,000
(*11) CAB-551-0.2: Cellulose acetate butyrate, Eastman Chemical Products, Inc., trade name, acetyl group content=2.0%, butyryl group content=52%, number average molecular weight 30,000
(*12) Nitro cellulose DHX30-50: Nobel NC Co., Ltd., trade name, nitro cellulose, nitrogen content about 12%, number average molecular weight 76,000
(*13) Hostavin 3206HP LIQ: Du Pont, trade name, ultraviolet absorber
(*14) Tinuvin 292: BASF A.G., trade name, ultraviolet absorber
(*15) Tinuvin 123: BASF A.G., trade name, light stabilizer
(*16) Metasheen 71-0010: BASF A.G., trade name, vapor-deposition aluminum pigment, mean particle size of 12 μm, thickness of 20 nm
(*17) Metalure L55700: Eckart, trade name, vapor-deposition aluminum pigment, mean particle size of 11 μm, thickness of 35 nm
(*18) Starbrite 2100-EAC: Silverline, trade name, vapor-deposition aluminum pigment, mean particle size of 10 μm, thickness of 30 nm
(*19) 6360NS: Toyo Aluminium K.K., trade name, aluminum pigment, mean particle size of 10 μm, thickness of 250 nm
(*20) MS650 Moonlight-Silver: Toyo Aluminium K.K., trade name, aluminum pigment, mean particle size of 13 μm, thickness of 60 nm.

Preparation of Coated Aluminum Wheel

Aluminum wheels that had been subjected to chromium-free conversion treatment were spray-coated with ALC-100 110RO8 black (Kansai Paint Co., Ltd., trade name, organic solvent-type acrylic resin coating composition) to a thickness of 30 μm on a dry film basis, and heated at 140° C. for 10 minutes.

The metallic coating compositions were individually applied thereon by spraying to a thickness of 0.3 μm on a dry film basis. ALC-2-1K clear (Kansai Paint Co., Ltd., trade name, organic solvent-type acrylic resin coating composition) was then applied thereon to a thickness of 30 μm on a dry film basis, and heated at 140° C. for 20 minutes, thereby obtaining coated aluminum wheels for testing.

The coated aluminum wheels were evaluated in the following tests. Tables 2 to 4 show the results.

(*21) Coating Composition Stability

The metallic coating compositions (solids content: 40 mass %) were individually placed in a 100-mL glass container, and hermetically sealed and stored at 35° C. for 35 days. Thereafter, the state of each composition was evaluated in accordance with the following criteria.

S indicates that the state remains the same as that before storage, and is excellent.
A indicates that a slight increase in viscosity is observed, but that stirring for 1 minute or less can regain the original state.
B indicates that an increase in viscosity is observed, and that stirring for more than 1 minute to 10 minutes or less can regain the original state.
C indicates that separation of layers is observed, and that the composition cannot be used as a coating composition.

(*22) Finished Appearance

Each test panel was visually observed, and the degree of occurrence of metallic mottling was evaluated in accordance with the following criteria.
S indicates that almost no metallic mottling is observed, and that the coating film has an extremely excellent appearance.
A indicates that a slight amount of metallic mottling is observed, but that the coating film has an excellent appearance.
B indicates that a considerable amount of metallic mottling is observed, and that the coating film has somewhat a poor appearance.
C indicates that a large amount of metallic mottling is observed, and that the coating film has a poor appearance.

(*23) Adhesion (after Immersion in Water)

Each test panel was immersed in warm water at 40° C. for 240 hours, and washed with water. A grid of 100 squares (2 mm×2 mm) was made on the coating films in accordance with JIS K 5600-5-6 (1990). Adhesive tape was applied to the surface of the grid portion, and abruptly peeled off. Then, the number of squares of the grid remaining on the surface of each coating film was evaluated.
S indicates that the number of remaining squares/the total number of squares=100/100, with no chipped edges observed.
A indicates that the number of remaining squares/the total number of squares=100/100, with chipped edges observed.
B indicates that the number of remaining squares/the total number of squares=99 to 90/100.
C indicates that the number of remaining squares/the total number of squares=89 or less/100.

(*24) Weatherability

In this accelerated weathering test, the Super Xenon Weather Meter (trade name, Suga Test Instruments Co., Ltd.) specified in JIS B 7754 was used. The test panels were irradiated with a xenon arc lamp for 1 hour and 42 minutes, and then exposed to rainfall for 18 minutes. This 2-hour session was determined to be 1 cycle, and each test panel was subjected to 500 cycles of this repeating test. After completion of the test, the test panels were compared with spare panels stored in a laboratory (original panels), and evaluated.
S indicates that no defect is observed on the surface of the coating film, and that the color difference LE according to JIS Z 8730 between the original panel and the panel subjected to the test is less than 1.0.
A indicates that slight color change into yellow is observed on the coating film, but that there is no occurrence of cracking, with the color difference LE according to JIS Z 8730 between the original panel and the panel subjected to the test being 1.0 or more and less than 2.0; there is no problem as a product.
B indicates that color change into yellow is observed on the coating film, but that there is no occurrence of cracking, with the color difference LE according to JIS Z 8730 between the original panel and the panel subjected to the test being 2.0 or more and less than 3.0.

C indicates that color change into yellow is observed on the coating film, and that the color difference LE according to JIS Z 8730 between the original panel and the panel subjected to the test is 3.0 or more; or that there is cracking on the coating film.

(*25) Specular Gloss at 60° C.

Specular gloss at 60° C. was measured in accordance with JIS K5600-4-7. A gloss meter (VG-2000) produced by Nippon Denshoku Industries Co., Ltd. was used for the measurement. Evaluation was performed in accordance with the following criteria.

S indicates that the specular gloss is 220 or more.
A indicates that the specular gloss is 200 or more and less than 220.
B indicates that the specular gloss is 170 or more and less than 200.
C indicates that the specular gloss is less than 170.

INDUSTRIAL APPLICABILITY

The invention can provide a metallic coating composition excellent in coating composition stability and capable of forming a coating film excellent in finished appearance, adhesion, weatherability, and specular gloss.

The invention claimed is:

1. A metallic coating composition comprising:
    a binder component comprising
        a phosphate group-containing acrylic resin (A),
        a polyisocyanate compound (B), and
        a cellulose resin (C); and
    a vapor-deposition aluminum pigment (D),
    the vapor-deposition aluminum pigment (D) being present in an amount of 65 to 92 parts by mass per 100 parts by mass of the total solids content of the binder component, and
    the phosphate group-containing acrylic resin (A) being a copolymer resin of a monomer mixture consisting of 3 to 48 mass % of a phosphate group-containing polymerizable unsaturated monomer (a1), 6 to 45 mass % of a hydroxy-containing polymerizable unsaturated monomer (a2), and 10 to 91 mass % of other polymerizable unsaturated monomer (a3), based on the total amount of all of the monomers,
    wherein the vapor-deposition aluminum pigment (D) is an aluminum flake having a mean particle size of 1 to 50 μm and a thickness of 0.01 μm to 0.05 μm,
    wherein the metallic coating composition is an organic solvent based coating composition.

2. The metallic coating composition according to claim 1,
    wherein the phosphate group-containing acrylic resin (A) is present in an amount of 50 to 90 parts by mass,
    the polyisocyanate compound (B) is present in an amount of 5 to 40 parts by mass, and
    the cellulose resin (C) is present in an amount of 1 to 20 parts by mass, per 100 parts by mass of the total solids content of the binder component.

3. The metallic coating composition according to claim 1, further comprising an ultraviolet absorber (E) in an amount of 0.1 to 10 parts by mass per 100 parts by mass of the total solids content of the binder component.

4. The metallic coating composition according to claim 1, wherein the solids content of the metallic coating composition is 0.1 to 2 mass %.

5. A method for forming a coating film comprising:
    forming a base coating film on an aluminum substrate;
    forming a metallic coating film of the metallic coating composition according to claim 1 on the base coating film; and
    forming at least one layer of a clear coating film on the metallic coating film.

6. An aluminum wheel obtained by the method for forming a coating film according to claim 5.

* * * * *